United States Patent [19]

Ryan et al.

[11] 4,098,996

[45] Jul. 4, 1978

[54] REGENERATED CELLULOSE FILM RECOVERY PROCESS

[75] Inventors: Daniel John Ryan, Chester; Edward Andrew Wielicki, Philadelphia, both of Pa.

[73] Assignee: FMC Corporation, Philadelphia, Pa.

[21] Appl. No.: 770,727

[22] Filed: Feb. 22, 1977

[51] Int. Cl.² ............................ C08B 3/32; C08B 5/16; C08B 16/00

[52] U.S. Cl. ........................................ 536/57; 260/2.3; 264/37; 264/38; 536/40; 536/60; 536/61

[58] Field of Search ................... 536/57, 60, 61, 56, 536/40; 260/2.3; 264/37, 38

[56] References Cited

U.S. PATENT DOCUMENTS

| 2,184,586 | 12/1939 | Donagemma et al. ................. 536/61 |
| 2,337,928 | 12/1943 | Reichel .................................. 536/57 |
| 2,362,217 | 11/1944 | Schlosser et al. ...................... 536/61 |
| 2,886,563 | 5/1959 | Grohganz ............................... 536/61 |
| 3,758,457 | 9/1973 | Broeck et al. .......................... 536/56 |
| 3,884,907 | 5/1975 | Laurance et al. ....................... 536/57 |

Primary Examiner—Ronald W. Griffin
Attorney, Agent, or Firm—Christopher Egolf; Eugene G. Horsky

[57] ABSTRACT

Waste raw uncoated and/or coated (such as saran, nitrocellulose and vinyl) regenerated cellulose film is treated to recover its plasticizer and cellulose components for recycling in the manufacture of regenerated cellulose film. The platicizer is first recovered from comminuted waste film particles via extraction with water. The moist comminuted film particles are then converted to viscose, from which coating solids, if any, are removed. The viscose is thereafter employed in the manufacture of regenerated cellulose film.

10 Claims, 2 Drawing Figures

REGENERATED CELLULOSE FILM RECOVERY PROCESS

BACKGROUND OF THE INVENTION

The present invention relates to an improved recovery process for coated and/or uncoated, plasticized regenerated cellulose film waste. More particularly, such waste regenerated cellulose film is treated to reclaim the regenerated cellulose as a viscose solution and the plasticizer as an aqueous solution thereof, suitable for recycling in the production of new generated cellulose film.

"Waste" regenerated cellulose (popularly called cellophane) film, including both coated and uncoated film, is generated at several stages in the manufacture and finishing of such film. The amounts of waste regenerated cellulose film produced relative to the total film production is not insignificant, so both economic and disposal considerations provide an impetus towards recovery and/or recycling of the regenerated cellulose and other valuable components of the waste film. A representative coated regenerated cellulose film consists of three major components: regenerated cellulose constituting the film; plasticizer which imparts flexibility to the film; and one or more coating compositions on one or both surfaces of the film.

Methods proposed in the prior art for regenerated cellulose recovery are characterized by many complex process steps and operations, often involving the use of various solvents for selectively extracting each of the waste film components.

U.S. Pat. No. 3,758,457 issued to TenBroeck et al. discloses a method for recovering regenerated cellulose from coated waste cellophane film, wherein softener and coating materials are removed from the comminuted cellophane with solvents. The softener is first selectively extracted from the comminuted cellophane with a solvent, but the softener must then be recovered via distillation of the softener-insolvent extract before the softener can be reused in the manufacture of cellophane film. This comminuted cellophane is dried to remove traces of the softener extraction solvent, afer which the coating is extracted using a solvent that dissolves the coating from the comminuted cellophane. The comminuted cellophane is thereafter again dried and may be employed as recycle material, by its conversion to viscose solution, in the manufacture of regenerated cellulose film.

An improved means for removing the residual coating extraction solvent from the comminuted cellophane in the TenBroeck et al. method is taught in U.S. Pat. No. 3,884,907 issued to Laurance et al., but this invention does not reduce the complexity or the number of individual process steps of the TenBroeck et al. method.

While the prior art methods provide one approach for recovering regenerated cellulose and other major components from waste cellophane film, a simplified recovery process is desirable because of the complexity and number of process operations required in such methods. Fewer process steps may usually be translated into reduced equipment, labor and time requirements, and savings on or elimination of some ancillary raw materials (e.g., extraction solvents, steam).

SUMMARY OF THE INVENTION

In the process of the present invention, plasticized regenerated cellulose film, at least a portion being coated film, is treated to recover the cellulose and plasticizer components of the film. The regenerated cellulose film recovery process, especially adapted to salvaging coated and uncoated cellophane film waste generated in film manufacturing operations, comprises the steps of (a) comminuting the regenerated cellulose film;

(b) extracting the plasticizer from the comminuted cellulose film particles by leaching the cellulose with water at a temperature of between 5° C to 70° C;

(c) after leaching, steeping the still moist comminuted cellulose film particles in caustic soda solution to form an alkali cellulose and thereafter xanthating the alkali cellulose with carbon bisulfide to provide a viscose which contains undissolved coating solids; and (d) separating the coating solids from the viscose thereby obtaining a viscose suitable for use in the manufacture of regenerated cellulose film.

The aqueous plasticizer extract is recyclable as make-up solution to a plasticizer bath (typically an aqueous solution of polypropylene glycol, polyethylene glycol and/or glycerine) in the manufacture of plasticized regenerated cellulose film. The extraction of the plasticizer from the comminuted cellulose film particles in the present method preferably is accomplished in a multi-stage, countercurrent extraction. The plasticizer extract obtained using this preferred extraction technique is usually sufficiently concentrated for direct addition as make-up solution in a plasticizer bath without further concentration.

Undissolved coating solids contained in the viscose are preferably removed from the viscose via centrifugation which may be followed by a final filtration step if so desired. The solids-free viscose is thereafter recyclable in the production of regenerated cellulose film, being added to conventionally prepared viscose ready for casting into film.

DETAILED DESCRIPTION

The coated and uncoated plasticized regenerated cellulose film (often designated herein as waste film) utilized in the recovery process of the present invention is generated at several stages during the film manufacturing and finishing operations. The term "waste film" as used herein comprises all surplus, scrap and off-grade film that may be unsuitable for normal end use applications, such as packaging film. Not unexpectedly, both the physical and chemical characteristics of the waste film can vary considerably depending on its source.

Waste film typically includes film edge trimmings, the beginning and end of film rolls, film containing surface defects or tears, otherwise off-grade film failing to meet product quality specifications, etc. Segregation of the waste film obtained from each of the various product films is often impractical in commercial film production facilities, so the waste film is typically a mixture of both coated and uncoated films, having an assortment of film coatings, plasticizers, additives and the like.

Although the present method is particularly designed for recovering regenerated cellulose from coated films, it should be noted that uncoated waste film and mixtures of coated and uncoated waste film are readily accommodated by the recovery process of this invention without sacrifice in efficiency. In the commercial application of this invention, uncoated waste film is routinely combined with coated waste film and the waste film mixture is processed, as described below, in the same fashion as 100% coated waste film.

A representative composition for regenerated cellulose film that has been solvent-coated on both surfaces is as follows, all percentages being by weight based on the total film weight:

Regenerated Cellulose Film: 69–77%
Film Plasticizer: 14–22%
Coating Layer: 4–12%

The moisture content of such waste coated film averages around 4 to 9%, based on the weight of the coated film.

The thickness (gauge) of the regenerated cellulose film, exclusive of coating, is generally about 0.7 to 1.4 mil, which alternatively may be expressed as unit weight of between 27 to 62 $gm/m^2$.

Regenerated cellulose film is generally produced by the viscose process which has been described extensively in patents and technical literature. Briefly stated, the viscose process entails first steeping wood pulp (cellulose) in a caustic soda solution to form an alkali cellulose. Excess liquor is drained from the alkali cellulose which is then shredded and allowed to age for 2 to 3 days. The aged alkali cellulose is converted to a cellulose xanthate by reaction with carbon bisulfide. The cellulose xanthate is then dissolved in dilute caustic soda solution to produce a viscose solution. The cellulose xanthate/viscose is ripened for 4 to 5 days, after which it is filtered to obtain a viscose suitable for the manufacture of regenerated cellulose film.

The viscose is extruded through a narrow slot in a casting die and into a coagulating bath of sulfuric acid-sodium sulfate to form a continuous film. The cellulose xanthate in this extruded film of viscose is decomposed in the coagulating bath, resulting in the coagulation and regeneration of the cellulose into a continuous gel-film.

The regenerated cellulose film is then subjected to a series of treatment baths through which the continuous film passes prior to being dried. The bath sequence is typically (1) water washing and desulfurization; (2) bleaching with sodium hypochlorite; (3) water washing; and (4) plasticizing to increase film flexibility, followed by drying of the treated film.

As noted above, the plasticizer, occasionally called a softener, is used to impart flexibility to the film. The regenerated cellulose film is commonly impregnated with the plasticizer by immersion of the film in an aqueous bath typically containing 5 to 15% by weight plasticizer. Plasticizers used include polypropylene glycol, polyethylene glycol, glycerine, and other polyhydric alcohols and mixtures thereof. Both coated and uncoated regenerated cellulose films are customarily plasticized.

As the final step in the treatment sequence described above, the regenerated cellulose film is dried to a moisture content of about 3 to 6% by passing the continuous film over a series of heated rollers.

Although the plasticized regenerated cellulose film thus produced is satisfactory for some end usages, films intended for packaging or similar applications are usually coated on one or both surfaces to improve various film characteristics. Polymeric coatings applied to regenerated cellulose films usually contain nitrocellulose, polyvinylidene chloride (saran), polyvinyl chloride or polyethylene as the principal constituent and serve to impart or enhance film properties, such as gas impermeability, moisture barrier characteristics, dimensional stability and heat sealing performance.

Coating thickness depends on the manner by which the coating composition is applied to the film, representative coating methods being solvent coating and extrusion coating. Solvent-coated films have relatively thin coating layers with thicknesses ranging from between 2.0 to 4.0 $gm/m^2$. By contrast, a typical layer provided by extrusion coating is about 6 $gm/m^2$ in thickness.

In solvent coating, the coating materials are ordinarily applied to the film as an organic solution, the solvent being, for example, toluene, butyl acetate, methylethyl ketone, tetrahydrofuran, ethanol or mixtures of these. The continuous regenerated cellulose film is typically passed through the coating solution which is spread evenly over the film surface at a controlled thickness via doctor rolls or the like. The coating solvent is thereafter evaporated to leave a dry coating on the regenerated cellulose film surface.

The recovery process of the present invention is capable of handling film coated by either solvent coating or extrusion coating techniques. Moreover, there are no known limitations on the recovery process imposed by the thickness of either the regenerated cellulose film or its coating.

A representative nitrocellulose-based coating for regenerated cellulose film has the following composition, all percentages by weight:

Nitrocellulose: 43%
Plasticizers: 35%
Additives (waxes, blending resins and the like): 22%

Polyvinylidene chloride (saran) coatings are exemplified by the following representative formulation, all percentages by weight:

Polyvinylidene chloride: 94%
Additives (waxes, lubricants and the like): 6%

The coating formulations shown above are intended as illustrative of typical coating compositions. The recovery process of the present invention is not limited to these particular coating formulations but is adapted to handling coated films having coatings that are generally described in the art as polyvinylidene chloride (saran), nitrocellulose, polyvinyl chloride or polyethylene coatings.

Figure 1:
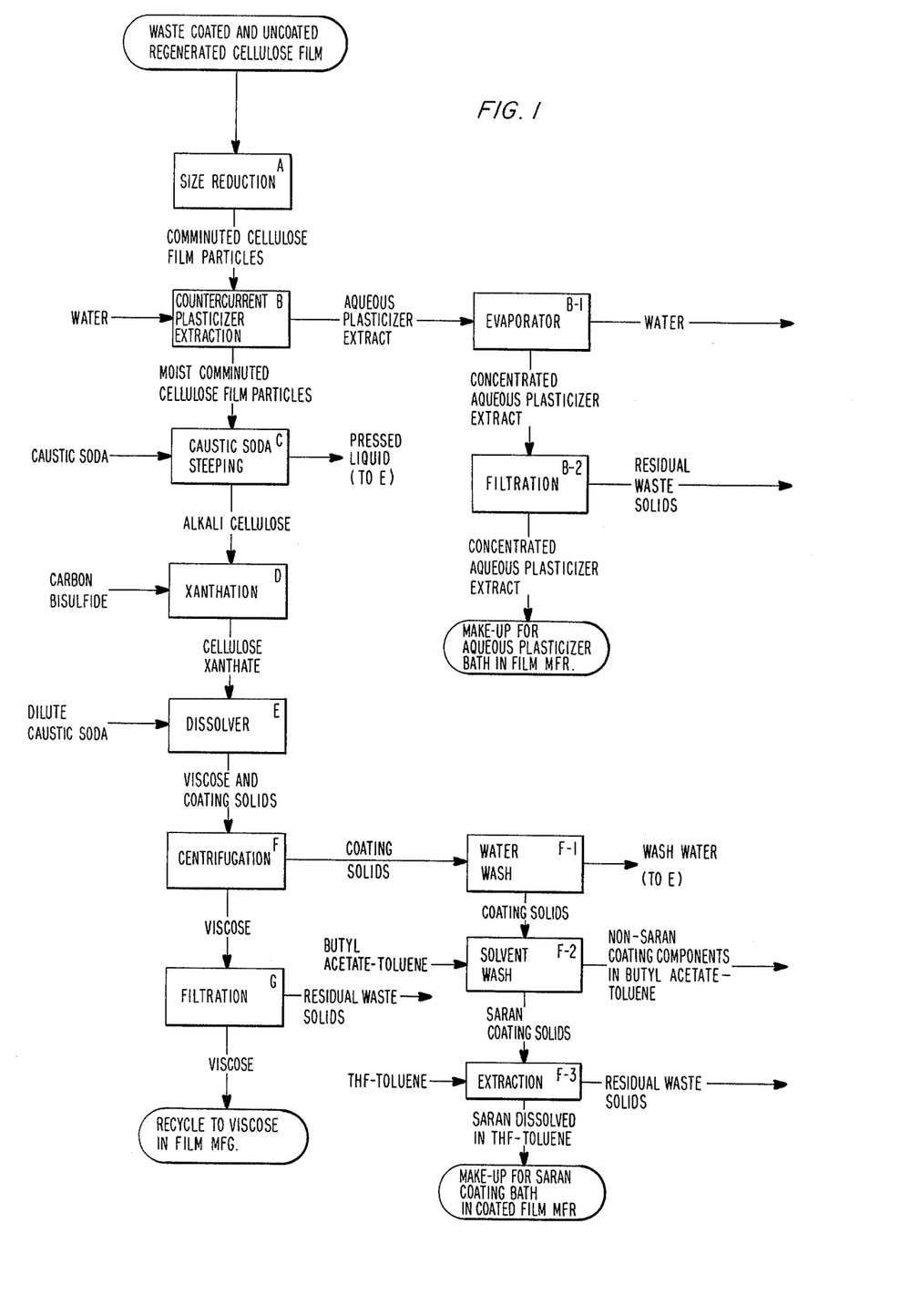
FIG. 1 is a block diagram depicting the operations and material flow streams for the film recovery process in a preferred embodiment of the present invention.

In the recovery process of the present invention, the waste regenerated cellulose film is first reduced in size, as indicated in the block diagram of FIG. 1. Size reduction of the waste film is necessary to achieve good efficiencies from a yield and time standpoint in the plasticizer extraction and viscose preparation steps.

The waste film, which may consist of pieces ranging from a few square inches to several square feet in area, is reduced to a size such that substantially all, at least 90% by weight, of the particles pass through a 10 mesh U.S. Sieve screen (2.00 mm opening), and none of the particles exceeds ¼ in. (6.35 mm) in the largest dimension. (All sieve data in this disclosure are expressed as U.S. Sieve Series). Particles which are smaller than mentioned above may be used, but energy requirements may well militate against excessive size reduction below 100 mesh U.S. Sieve (149 micron opening).

The size reduction of the waste film is typically designated as comminution, such term including milling, grinding, attriting and other similar size reduction procedures. Comminution may be accomplished by any suitable comminuting means, such as rotary knife cutters, hammer mills, ball mills, paper beaters, attrition mills, and the like. A rotary knife cutter is the preferred comminution means because of its ability to produce more uniform particles having clean cut ends with minimal pinching or closing off of the ends of the comminuted particles. Moreover, a rotary knife cutter assists in controlling the comminuted cellulose film particle size because of its stationary screen through which the particles pass. Optionally, the waste film may be preshredded to facilitate its feeding into the rotary knife cutter.

The extraction efficiency in the subsequent plasticizer removal step may be adjusted, within limits, by the particle sizing of the comminuted cellulose film. Comminuted cellulose film having a particle size which passes through a 10 mesh U.S. Sieve will yield satisfactory plasticizer extraction efficiencies (time and recovery yield) in most commercial leaching equipment. However, improved plasticizer extraction efficiencies may often be achieved, depending on the nature of the leaching equipment available, through the use of more finely comminuted cellulose film particles, for example, less than 25 mesh U.S. Sieve.

The waste film is preferably dry during the comminution step although comminution may also be accomplished as a wet grinding operation so long as the requisite particle sizing is met.

After the regenerated cellulose film is reduced in size in the first step of the present recovery process, the comminuted cellulose film particles are passed to an extractor where the plasticizer is leached from the cellulose with water, as represented in FIG. 1 by Block B. Plasticizers for regenerated cellulose film, such as propylene glycol, polyethylene glycol, glycerine, and other polyhydric alcohols and mixtures thereof, are water-soluble and are thus readily susceptible to extraction from the comminuted cellulose film particles as aqueous solutions. In this disclosure, the terms "leaching" and "extraction" are used interchangeably with reference to the removal of the soluble plasticizer as an aqueous solution from the water-insoluble cellulose in the comminuted cellulose film particles.

The plasticizer extraction is preferably accomplished with water, although dilute plasticizer solutions or other aqueous solutions may be utilized as the extracting medium. The presence of non-plasticizer components in the aqueous extracting medium may preclude direct recycle of the aqueous extract solution to a plasticizer bath in the manufacture of regenerated cellulose film. References to water as the extracting medium in this disclosure are intended to include all aqueous extracting media which are suitable for use in this recovery process.

The plasticizer extraction procedure may be accomplished with water over a wide range of temperatures ranging from about 5° C to 70° C or more. Extractions performed with water at a temperature between 15° to 25° C are very satisfactory in terms of extraction efficiencies, but higher temperatures up to about 40° C are most preferred. Above 40° C there is an increasing likelihood of coating degradation with some types of coatings, e.g., saran coatings.

The improved extraction efficiencies obtained with water at a preferred higher extraction temperature is illustrated by a comparison of extractions performed with water at 40° C and 25° C. An extraction of 98% of the plasticizers from comminuted cellulose film particles with water at 40° C requires only 10 minutes, while the same degree of extraction performed with water at 25° C requires 30 minutes contact time, all other conditions being equal.

The plasticizer extraction procedure may be accomplished as a single step or multi-stage operation. A countercurrent, multi-stage extraction technique is preferred since a relatively high proportion of plasticizer is thereby leached from the comminuted cellulose film particles as a more concentrated aqueous extract. In the countercurrent extraction procedure, the comminuted cellulose film particles are passed through a series of two or more extraction stages, and in each stage they are intimately contacted with the extraction agent, flowing in a direction countercurrent to that of the cellulose particles. Since the direction of flow of the comminuted cellulose film particles through the sequence of extractions is countercurrent to the overall flow of the aqueous extraction solution, the incoming fresh water (or other aqueous extracting agent) first contacts cellulose particles which are in their final extraction stage and from which substantially all plasticizer has been removed. The incoming untreated comminuted cellulose film particles, on the other hand, are contacted in the first extraction stage with a relatively concentrated aqueous plasticizer extract, which is thereby increased in concentration even further by the high proportion of plasticizer in the fresh, untreated cellulose particles.

If desired, the efficiency of the countercurrent extraction procedure may be augmented by a countercurrent backwash for rinsing or washing the comminuted cellulose film particles after each extraction stage. The backwashing technique simply involves the use of the incoming aqueous solution at a given stage to wash the cellulose particles that have been extracted in that stage.

The backwashing procedure, while not essential to the present invention, significantly aids in recovering plasticizer values that might otherwise remain with the comminuted cellulose film particles in the extraction sequence. Regenerated cellulose film, dried once, will typically absorb 1-1.2 times its own weight in water. Laboratory tests have indicated, however, that additional water is carried interstitially by the comminuted cellulose film particles such that the total water (absorbed and interstitial) associated with the cellulose particles is as much as 2.0 to 3.0 times the dry cellulose weight. Depending on the filter medium and separation techniques used to separate the aqueous plasticizer extract from the comminuted cellulose particles, the amount of water retained in the dewatered comminuted cellulose film particles is typically 2 to 2.5 times the weight of the cellulose.

The backwashing technique, when used in conjunction with the countercurrent extraction procedure described above, will often produce significant improvements in the overall plasticizer extraction efficiency. A comparison of plasticizer recovery yields for 2 and 3-stage countercurrent extractions operated with and without backwash indicates the advantages of using a backwash:

| PLASTICIZER RECOVERY YIELDS, % | | |
|---|---|---|
| | No Backwash | Backwash |
| 2 stages | 87.1 | 91.9 |
| 3 stages | 92.7 | 95.7 |

Another means for improving the overall extraction efficiency of the plasticizer extraction procedure is by recycling a portion of the aqueous solution extract back to the same extraction stage from which it was obtained. The primary benefit of such recycling in one or more of the individual extraction stages is the ability to maintain a higher liquid-to-solids ratio in the extraction stage than would otherwise be possible.

As was mentioned previously in connection with the size reduction or comminution step, the particle size of the comminuted cellulose film directly affects extraction efficiency in the plasticizer recovery step. The extraction efficiency is controlled, in part, by the uncoated surface area of the comminuted cellulose film particles available for diffusion of the plasticizer into the aqueous extraction agent. The coating on the film surfaces acts as a barrier to diffusion of the plasticizer from the film into the extracting agent. Size reduction of the coated cellulose film by comminution serves to increase the uncoated surfaces through which the plasticizer can pass by diffusion into the extraction agent and, for this reason, is essential to the rapid and efficient removal of the plasticizer from coated film.

Figure 2:
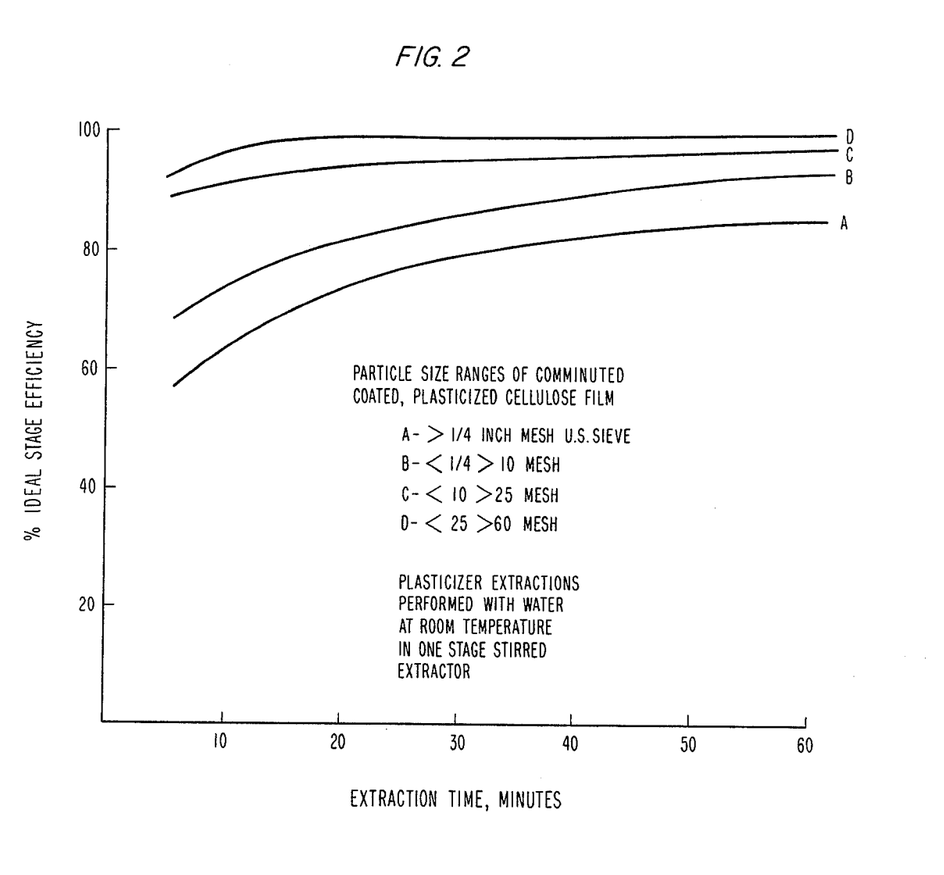
FIG. 2 is graph showing plasticizer extraction efficiencies as a function of comminuted cellulose film particle size.

Experimental data for plasticizer extraction efficiency as a function of the comminuted cellulose particle size are presented in graphical form in FIG. 2. Four separate particle size ranges were studied: $>\frac{1}{4}$ in. mesh; $<\frac{1}{4}$ in.$>$ 10 mesh U.S. Sieve; $<10>$ 25 mesh U.S. Sieve; and $<25>$ 60 mesh U.S. Sieve. The graph shows plots of percent ideal stage efficiency (a measure of extraction efficiency) versus extraction time for each of the four comminuted cellulose particle size ranges. These extraction experiments were performed under similar conditions in single stage stirred extractor using water at room temperature (approximately 25° C) as the extraction agent.

For particles in the $>\frac{1}{4}$ in. mesh and $<\frac{1}{4}$ in.$>$ 10 mesh size ranges, an 85% ideal stage efficiency was achieved only after 60 minutes and 30 minutes, respectively. Much better extraction efficiencies were obtained with the $<10>$ 25 and $<25>$ 60 mesh particles, both of which achieved over 85% ideal stage efficiency in under 5 minutes, and exceeded 95% ideal stage efficiency after 30 minutes. Comminuted cellulose film particles utilized in the plasticizer recovery step of this invention should therefore minimally be less than $\frac{1}{4}$ in. in size such that substantially all of the particles, at least 90%, pass through a 10 mesh U.S. Sieve. The comminuted cellulose film particles should preferably be less than 25 mesh U.S. Sieve for the most rapid and efficient extraction of the plasticizer.

Additional laboratory tests were performed to study the effect of particle shape on the plasticizer extraction efficiency. No significant differences were observed in the extraction efficiencies of needle vs. chip-shaped comminuted cellulose film particles in the size range $<10>$ 25 mesh or $<25>$ 60 mesh U.S. Sieve.

One advantage peculiar to the method of the present invention is that there is no minimal level of plasticizer in the comminuted cellulose film particles that must necessarily be reached by extraction to avoid difficulties in subsequent viscose preparation steps. The economic value of the plasticizer, however, makes it desirable to reduce the plasticizer level in the comminuted cellulose film particles from a typical 14 to 22% level to below 1.0% by weight, based on the weight of the cellulose.

In the method of the present invention, a relatively concentrated plasticizer extract may be obtained under reasonable extraction conditions while simultaneously reducing residual plasticizer values in the extracted comminuted cellulose film particles to less than 1% by weight, based on the weight of the cellulose. For example, the use of 3 countercurrent extraction stages without backwashing in this method with water at a temperature of 25° C as the extraction agent enables the recovery of an extract containing 6% by weight of plasticizer from typical waste film, leaving a residual 1% by weight plasticizer level in the treated cellulose particles. Using the preferred backwashing procedure in the 3-stage countercurrent extraction just described, an aqueous extract containing 9% plasticizer is normally obtained. This extract is desirably, but not necessarily, evaporated to increase the plasticizer concentration to 10 to 40% by weight or more. The extract, whether or not concentrated by evaporation or the like, is then preferably filtered to remove any insolubles such as fine cellulose particles entrained in the solution. The extract may be utilized as makeup solution for a plasticizer bath to replenish plasticizer absorbed and removed from the bath in the manufacture of plasticized regenerated cellulose film.

Among the advantages of the present recovery process over the prior art methods are that (1) the plasticizer extract from the plasticizer extraction step is an aqueous solution of the plasticizer and may be reused directly as makeup in an aqueous plasticizer bath, (2) the aqueous extract is often sufficiently concentrated for use as makeup solution without need for additional concentration of the solution and (3) there is no requirement that the residual plasticizer in the treated cellulose particles after extraction be below a certain set concentration level.

The comminuted cellulose film particles from which the plasticizer has been extracted are dewatered, either as a final step in the extraction or as a post-extraction procedure, depending on the type of extraction apparatus utilized. The solution from the dewatering operation is normally used as a wash solution or combined with water used in the plasticizer extraction procedure. As mentioned earlier, the dewatered cellulose particles, which may be characterized as a moist solids, typically retain 2 – 3 parts by weight of dilute aqueous extract for each one part of cellulose, a representative analysis being 71% water, 26% cellulose and 3% coating materials, all percentages by weight.

It is important that the dewatered cellulose film particles not be dried but rather are passed to the viscose preparation stage in their still moist state. Drying of the cellulose particles has been found to create a denser structure that often reduces the reactivity of such dried comminuted cellulose film particles.

After dewatering following the extraction procedure, the comminuted cellulose film particles are ready for conversion into viscose as described below. The size reduction of the waste film in the previous comminution step is more than sufficient to insure good yields in the viscose conversion step. Further size reduction of the dewatered comminuted cellulose film particles may enhance viscose conversion efficiency by reducing the amount of residual undissolved cellulose in the viscose prepared from such cellulose particles. Such additional attrition of the moist comminuted cellulose film particles is entirely optional in the recovery process of the present invention.

The moist comminuted cellulose material, whether or not subjected to further size reduction after dewatering, is next utilized to prepare a viscose as indicated by Blocks C, D and E in FIG. 1. Many of the procedures for this operation are similar to conventional viscose processing methods and thus do not require detailed explanations. Greater attention, however, is given to those aspects of the viscose preparation in the method of the present invention which differ from conventional viscose processing steps.

The dewatered but still moist cellulose is first charged into a reaction vessel, preferably equipped for mixing its contents, for the preparation of an alkali cellulose by reaction with caustic soda solution. The reaction vessel contents are desirably maintained at a low temperature, around 0° C, to promote swelling of the cellulose, which facilitates its reaction with caustic soda.

Sufficient caustic soda solution is added gradually with mixing to obtain a moist alkali cellulose having a preferred composition of about 25% cellulose, 12.5% caustic soda (NaOH) and 62.5% water, all proportions by weight and on a coating-free basis. The gradual addition of the caustic soda solution ensures good distribution of the caustic soda solution with the cellulose. The 62.5% moisture level results in a relatively dry alkali cellulose that is readily converted to a viscose solution after xanthation without the formation of lumps which are difficult to solubilize. The 2:1 cellulose to NaOH ratio provides for the target viscose composition of 9% cellulose and 5.5% NaOH, and is preferred for that reason. Nevertheless, the relative proportions of cellulose, caustic soda and water may be varied from the preferred proportions set forth above without adversely affecting viscose properties or the successful operation of the present process.

The caustic soda concentration is not critical and may be added as a 50% solution followed by the requisite water dilution or, alternatively, as a more dilute solution designed to yield the desired proportions of cellulose, caustic soda and water. The caustic soda solution may optionally be precooled to a temperature of 0 to 5° C prior to its addition to facilitate rapid reaction of the swollen cellulose with the caustic soda. However, a satisfactory alkali cellulose reaction product may also be obtained, with some sacrifice in reaction efficiency, without resort to the low temperature reaction procedure described above.

Mixing of these components is continued after the addition of the caustic soda to ensure complete reaction of the caustic soda with the cellulose to form an alkali cellulose. The nature of the mixing equipment will determine the exact length this post-addition mixing period, but 0.5 to 1 hour is generally sufficient.

Upon completion of the mixing, the moist alkali cellulose is next converted to a cellulose xanthate by the addition of carbon bisulfide with mixing, as indicated by Block D in FIG. 1. A vacuum is first drawn, as in a conventional xanthation procedure, and carbon bisulfide, typically 25-30% by weight based on the cellulose, is added and mixing is continued until completion of the xanthation reaction is indicated by a vacuum regain. Temperature during the xanthation reaction is normally about 35°-40° C. Because the xanthation reaction is exothermic, the alkali cellulose can be cooled, if desired, to a low temperature, around 0° C, to avoid exceeding the boiling point of carbon bisulfide during the initial stages of the xanthation reaction.

The viscose is obtained by dissolution of the cellulose xanthate into a very dilute caustic soda solution, as shown in block E in FIG. 1. The dilute caustic soda solution is typically 1 to 2% NaOH, the precise concentration being that which will yield a viscose containing about 9% cellulose and 5.5% caustic soda (caustic soda to cellulose ratio = 0.61:1.0). The temperature during the dissolving step is desirably maintained at around 15° C to promote dissolution of the cellulose xanthate into viscose. Mixing is continued generally for 1 to 2 hours, to assure complete dissolution of the cellulose xanthate into the viscose. The resultant viscose may also be blended to minimize the amount of undissolved cellulose therein such as by passing a recycle stream of such viscose through an attritor.

The viscose solution that is produced by these procedures generally contains undissolved coating solids and small amounts of insoluble cellulose. Undissolved coating solids typically include the coating material itself (e.g., polyvinylidene chloride (saran) polymer), as well as waxes, blending resins, clays and the like commonly used in coating formulations.

Several viscoses were prepared from both coated and uncoated films using the procedures described above. Data for these laboratory viscoses are presented in Table I. All these viscoses were prepared under essentially the same conditions: the alkali cellulose compositions were uniformly 25% cellulose and 12.5% NaOH. In the xanthation 30% carbon bisulfide, based on cellulose, was added to the alkali cellulose at a temperature of 0° C and the xanthation reaction proceeded at a temperature of 30° C. Dissolution of the cellulose xanthate in dilute caustic soda solution was performed as indicated in the Table. Data for viscose appearance, viscosity (ball fall measurements taken for viscose after mixing and after ripening), sulfur content (total and xanthate sulfur) and cellulose and caustic analyses are contained in Table I.

Viscoses V1 and V2 (from Runs V1 and V2, respectively) were prepared from uncoated regenerated cellulose film. Viscoses V3 and V4 were made using a polyvinylidene chloride (saran)-coated regenerated cellulose film. A nitrocellulose-coated regenerated cellulose film was used to prepare viscose V5. Viscose V6 was prepared from a mixture of saran-coated (46%) and nitrocellulose-coated (21) films and uncoated film (33%), this mixture being representative of the relative proportions by weight of these films present in waste regenerated cellulose film generated at FMC Corporation's Marcus Hook, Pa. film production plant.

Viscoses V2, V4, V5 and V6 were centrifuged to separate residual undissolved cellulose and/or insoluble coating solids from the viscose. Filtration was attempted with viscoses V1 and V3 to provide a basis for comparison with the centrifugation technique, but the viscoses proved unfilterable in the laboratory apparatus normally utilized for determining viscose filtration characteristics.

In the recovery process of the present invention, the insoluble coating solids and residual undissolved cellulose that are present in the viscose are separated from the viscose, as depicted by Block F in FIG. 1. Centrifugation is the preferred technique for effecting this separation. Centrifugation is especially well suited for separating solids from polyvinylidene chloride-coated regenerated cellulose films, since the relatively high density saran particles assist in removing the less dense insoluble cellulose particles and gels. For uncoated regenerated cellulose films treated in this recovery process, centrifugation is likewise effective for removing any residual undissolved cellulose particles from viscose prepared from such films.

The insoluble coating solids that are separated from the viscose usually contain more than one type of coating, since segregation and separate processing in this recovery process of the different types of coated waste films are generally not feasible. Such separated solids containing mixed coating insolubles and undissolved cellulose may be discarded or, more preferably, may be treated further to recover the saran component from these coating solids, where the waste film being processed includes saran-coated film. The recovered polyvinylidene chloride polymer can then be used in the preparation of a coating solution bath utilized in the manufacture of saran-coated regenerated cellulose film.

In the preferred coating solids recovery procedure, the insoluble coating solids are first washed with water to remove traces of viscose. The wash water may be recycled to the viscose preparation step (Block E in FIG. 1) to be used in preparing the dilute caustic soda makeup solution or simply discarded. The water-washed coating solids are next washed with a butyl acetate/toluene solvent mixture or an equivalent solvent to selectively dissolve non-saran materials in the coating solids. The butyl acetate/toluene extract is thereafter processed, as for example, in a solvent cooker, to recover the solvent, the residual waste solids then being discarded.

The coating solids which were previously solvent-washed to remove non-saran components are extracted with an organic solvent such as tetrahydrofuran and more preferably an 85 to 15% mixture of tetrahydrofuran and toluene that is selective for polyvinylidene chloride. The residual waste solids from which the saran component has been removed are normally discarded after recovery of the solvent therein. The resultant extract solution of polyvinylidene chloride is then recycled, after adjustments to its composition, to the saran-coating bath solution utilized in coating regenerated cellulose film.

The viscoses from which coating solids and residual undissolved cellulose particles had been removed by centrifugation were evaluated for filterability. Filtration data were obtained to measure the effectiveness of centrifugation in producing a viscose having filtration characteristics comparable to those of a representative plant viscose. These data are summarized in Table II, which contains filterability data for viscoses V2, V4, V5 and V6 and for representative filtered and unfiltered plant viscoses. Viscoses V1 and V3 were not centrifuged and are therefore not included in the Table.

The filtration characteristics of these viscoses were measured using laboratory filtration apparatus normally used for obtaining filterability data for conventionally processed viscoses. This laboratory pressure filter is operated at a constant positive pressure of 40 psi, has a filter area of 12.9 cm and utilizes a Johnson & Johnson Rapid Pak Filter Dressing #541. Filterability of the viscoses is expressed as a $k$ value, which represents the slope of a plot of (time/weight of filtrate filtered) versus (time), at $t=0$. A typical plant viscose (filtered and unfiltered) will have a $k$ less than $4 \times 10^{-3}$, indicating excellent filterability. Two such plant viscoses are represented in Table II, as viscoses VC (filtered) and VC1 (unfiltered). A $k$ value lying between $5-8 \times 10^{-3}$, represents good filterability; between $9-12 \times 10^{-3}$, fair filterability; and above $13 - 10^{-3}$, generally poor filterability.

Using these qualitative rankings for $k$ values, uncoated film viscose V2 exhibited excellent filterability ($3.9 \times 10^{-3}$). Saran-coated and nitrocellulose-coated film viscoses (V4, V5) rated borderline fair to poor ($12.5-12.9 \times 10^{-3}$). The combined uncoated/coated film viscose (V6) exhibited fair-good filterability ($8.9 \times 10^{-3}$).

As described earlier, viscoses V2, V4, V5 and V6 were centrifuged prior to being measured for their filtration characteristics. It should be noted, however, that in commercial practice, the centrifugation of the viscose to separate out the solids is desirably, but not of necessity, followed by a final filtration to remove any residual filterable matter.

The centrifuged viscose is recycled and mixed with conventionally prepared viscose for use in the manufacture of regenerated cellulose film, as indicated in FIG. 1. The centrifuged viscose may be added at any point after the viscose preparation step for conventionally prepared viscose, but the recycled viscose is most conveniently added to the viscose that is ready to be cast into film. The proportion of recycled viscose to conventionally prepared viscose is normally controlled by the amounts of waste film being recycled. A 15% recycle – 85% conventional viscose ratio has been found very satisfactory, but higher or lower proportions of recycle can be used if desired, depending on the actual amounts of recycle viscose produced relative to non-recycle viscose.

Regenerated cellulose films were plate-cast from several blends of the viscoses described above to evaluate the characteristics of films prepared from such viscoses against representative conventional film cast from nonrecycled plant viscose. Data for these unplasticized platecast. films are tabulated in Table III, with the following viscoses being represented:

FC: 100% non-recycled plant viscose VC; control film
F1: 100% viscose V6 (prepared from a mixture of coated and uncoated films)
F2: 85/15 blend of plant viscose VC and viscose V6 (mixed coated and uncoated film)
F3: 85/15 blend of plant viscose VC and viscose V1 (uncoated film)
F4: 85/15 blend of plant viscose VC and viscose V4 (saran-coated film)
F5: 85/15 blend of plant viscose VC and viscose V5 (nitrocellulose-coated film)

All viscose blends are percent by weight.

The film physical properties measured and included in Table III are tensile strength, elongation, stiffness, tear strength, haze and degree of polymerization of the regenerated cellulose (average polymer chain length). Tensile strength, elongation, stiffness and tear strength for all recycle viscose films in Table III compare favorably with the values obtained for a typical film cast from plant viscose FC.

Haze readings obtained on these films show that films F2, F3, and F4 compare very well with the control film FC. The relatively higher haze values for films F1 and F5 are acceptable where transparency of the uncoated film is not a stringent requirement for its subsequent use. It should be noted that coating of such higher haze film in the usual manner tends to diminish the hazy appearance of the film. These higher haze readings for F1 and F5, as well as the slightly higher than average elongation value obtained for F5, appear due to the presence of nitrocellulose coating components in the regenerated cellulose film.

It should be noted that film F2 in Table III, a regenerated cellulose film obtained from an 85/15 blend of plant viscose and the mixed uncoated/coated film viscoses, is most representative of film produced commercially utilizing the cellulose recycle process of the present invention. As the data in Table III demonstrate, this recycle film (F2) compares very favorably in all respects with film (FC) cast from 100% plant viscose.

TABLE I
DATA FOR LABORATORY PREPARATION OF VISCOSE FROM WASTE CELLOPHANE

| Run | Alkali Cellulose Cellulose Charge | Dissolving of Cell.Xanth.in Dilute NaOH Temp. | Mixing Time | Appearance of Viscose | Treatment of Viscose | Viscose Ball Fall Viscosity Sec. | Viscose % Total Sulfur | Viscose % Xanth. Sulfur | Analyzed Composition of Viscose[1] Cell. | NaOH[2] |
|---|---|---|---|---|---|---|---|---|---|---|
| V1 | Uncoated moist comminuted cellulose film | 15° C. | 2 hrs. | Honey yellow (no lumps) | Filtration (attempted but unsuccessful) | Mixer 78 Ripe 69 | 2.14 | 1.72 | 10.0 | — |
| V2 | Uncoated moist comminuted cellulose film | 15° C | 2 hrs., Mixing continued 1 add'l hr. to dissolve lumps on mixer blades | Amber yellow | Centrifuged | Mixer 50 Ripe —[2] | 2.16 | 1.71 | 9.0 | 5.6 |
| V3 | Saran-coated moist comminuted cellulose film | 15° C | 2 hrs. blended add'l ½ hr. | Light brown | Filtration (attempted but unsuccessful) | Mixer 67 Ripe 77 | 2.16 | 1.71 | 10.6 | 5.5 |
| V4 | Saran-coated moist comminuted cellulose film | 15° C | 2 hrs. blended add'l ½ hr. | Light brown | Centrifuged | Mixer 45 Ripe 42 | 2.04 | 1.75 | 9.2 | 5.7 |
| V5 | Nitrocellulose-coated moist comminuted cellulose film | 15° C | 2 Hrs. blended add'l ½ hr. | Light yellow; very turbid | Centrifuged | —[2] | 2.03 | 1.62 | 9.9 | 5.5 |
| V6 | 33% Uncoated; 46% Saran-coated; 21% Nitrocellulose-coated moist comminuted cellulose film | 15° C | 2 hrs., blended add'l ½ hr. | Light yellow; somewhat turbid | Centrifuged | Mixer 61 Ripe 26 | 2.14 | 1.76 | 9.1 | 5.6 |

[1]Target composition of viscose: 9.0% cellulose; 5.5% sodium hydroxide
[2]No data available

TABLE II
VISCOSE FILTERABILITY[1]

| Viscose Designation | Viscose Cellulose Source | K Value, Cm$^{-2}$ | Plugging Value | Filtration Data: Grams Filtered; Filtration Time, Min. | Remarks |
|---|---|---|---|---|---|
| V2 | Uncoated Film | $3.9 \times 10^{-3}$ | 283 | 1000g; 3.75 min. | Centrifuged prior to filtration test |
| V4 | Saran-coated film | $13.0 \times 10^{-3}$ | 82 | 800g; 21.17 min. | Centrifuged prior to filtration test |
| V5 | Nitrocellulose-coated film | $11.5 \times 10^{-3}$ | 93 | 800g; 21.92 min. | Centrifuged prior to filtration test |
| V6 | 33% Uncoated, 46% Saran-coated and 21% Nitrocellulose-coated film | $8.9 \times 10^{-3}$ | 128 | 1000g; 9.80 min. | Centrifuged prior to filtration test |
| VC | Plant Viscose (Filtered) | $1.6 \times 10^{-3}$ | 853 | 800g; 4.13 min. | |
| VC1 | Plant Viscose (Unfiltered) | $3.9 \times 10^{-3}$ | 398 | 1300g; 11.05 min. | |

[1] All data obtained using J&J Rapid Pak Filter Dressing #541; filter area 12.9 cm$^2$; 40 psi constant positive pressure

TABLE III
PHYSICAL PROPERTIES OF UNPLASTICIZED PLATE-CAST REGENERATED CELLULOSE FILMS

| Film Designation | Viscose Used To Prepare Film | Film Thickness mils | Tensile Strength psi $\times 10^{-3}$ | Elongation % | Stiffness psi $\times 10^{-3}$ | Tear Strength[1] grams/mil | Haze[2] % | Average Degree of Polymerization |
|---|---|---|---|---|---|---|---|---|
| FC (control film) | 100 plant viscose VC (non-recycled) | 0.68 | 17.2 | 10.6 | 1228 | 6 | 3.0 | 420 |
| F1 | 100% viscose V6 (prepared from a mixture of coated and uncoated films) | 0.72 | 13.4 | 5.4 | 925 | 7 | 11.7 | 360 |
| F2 | 85-15% blend of plant viscose VC and viscose V6 (mixed coated and uncoated films) | 0.74 | 15.1 | 6.2 | 990 | 5.5 | 5.1 | 410 |
| F3 | 85-15% blend of plant viscose VC and viscose V1 (uncoated film) | 0.67 | 14.9 | 8.8 | 850 | 5.5 | 2.3 | —[3] |

TABLE III-continued
PHYSICAL PROPERTIES OF UNPLASTICIZED PLATE-CAST REGENERATED CELLULOSE FILMS

| Film Designation | Viscose Used To Prepare Film | Film Thickness mils | Tensile Strength psi $\times 10^{-3}$ | Elongation % | Stiffness psi $\times 10^{-3}$ | Tear Strength[1] grams/mil | Haze[2] % | Average Degree of Polymerization |
| --- | --- | --- | --- | --- | --- | --- | --- | --- |
| F4 | 85-15% blend of plant viscose VC and viscose V4 (saran-coated film) | 0.76 | 15.5 | 7.6 | 1045 | 5 | 2.1 | 395 |
| F5 | 85-15% blend of plant viscose VC and viscose V5 (nitrocellulose-coated film) | 0.74 | 16.6 | 12.2 | 998 | 4.5 | 10.4 | 380 |

[1]Elmendorf method
[2]Hunter Hazemeter
[3]No value obtained

We claim:

1. A process for recovering regenerated cellulose from plasticized regenerated cellulose film, at least a portion being coated film, which comprises
   (a) comminuting the regenerated cellulose film;
   (b) extracting the plasticizer from the comminuted cellulose film particles by leaching the cellulose with water at a temperature of between 5° C to 70° C;
   (c) after leaching, steeping the still moist comminuted cellulose film particles in caustic soda solution to form an alkali cellulose and thereafter xanthating the alkali cellulose with carbon bisulfide to provide a viscose which contains undissolved coating solids; and
   (d) separating the coating solids from the viscose thereby obtaining a viscose suitable for use in the manufacture of regenerated cellulose film.

2. The process as defined in claim 1 wherein the plasticizer in the plasticized regenerated cellulose film is selected from the group consisting of polyethylene glycol, polypropylene glycol, glycerine, and mixtures thereof.

3. The process as defined in claim 1 wherein the coating on the film consists essentially of a material selected from the group consisting of nitrocellulose, polyvinylidene chloride, polyvinyl chloride and polyethylene.

4. The process as defined in claim 3 wherein all of the regenerated cellulose film is coated.

5. The process as defined in claim 1 wherein all of the comminuted cellulose film particles are less than ¼ inch in their largest dimension and at least 90% by weight of such particles pass through a sieve of U.S. Sieve No. 10 mesh.

6. The process as defined in claim 1 wherein the plasticizer is leached from the comminuted cellulose film particles with water at a temperature of from 15° to 40° C.

7. The process as defined in claim 6 wherein the leaching of the plasticizer from the comminuted cellulose film particles with water is accomplished by countercurrent extraction so as to obtain an aqueous plasticizer extract which contains at least 5% by weight plasticizer, based on the weight of the extract, and cellulose particles which contain less than 1% by weight residual plasticizer after leaching, based on the weight of the cellulose.

8. The process as defined in claim 7 which further comprises
   (a) concentrating the aqueous plasticizer extract to a concentration of at least 10% by weight plasticizer, based on the weight of the extract, and
   (b) recycling the aqueous plasticizer concentrate into a regenerated cellulose film plasticizer bath.

9. The process as defined in claim 1 wherein the undissolved coating solids are separated from the viscose by centrifugation.

10. The process as defined in claim 1 wherein at least some of the coated film is coated with a coating consisting essentially of polyvinylidene chloride and which further comprises
   (a) washing the undissolved coating solids with water to remove residual viscose;
   (b) contacting the washed undissolved coating solids with a butyl acetate/toluene solvent mixture to selectively dissolve non-polyvinylidene chloride components from such solids;
   (c) thereafter contacting the undissolved coating solids with a tetrahydrofuran solvent to form a solution containing polyvinylidene chloride; and
   (d) recycling the polyvinylidene chloride solution into a polyvinylidene chloride-coating bath for use in preparing polyvinylidene chloride coated regenerated cellulose film.

* * * * *